May 2, 1950 M. K. BENSON 2,506,055
ANIMAL TRAP
Filed April 15, 1948
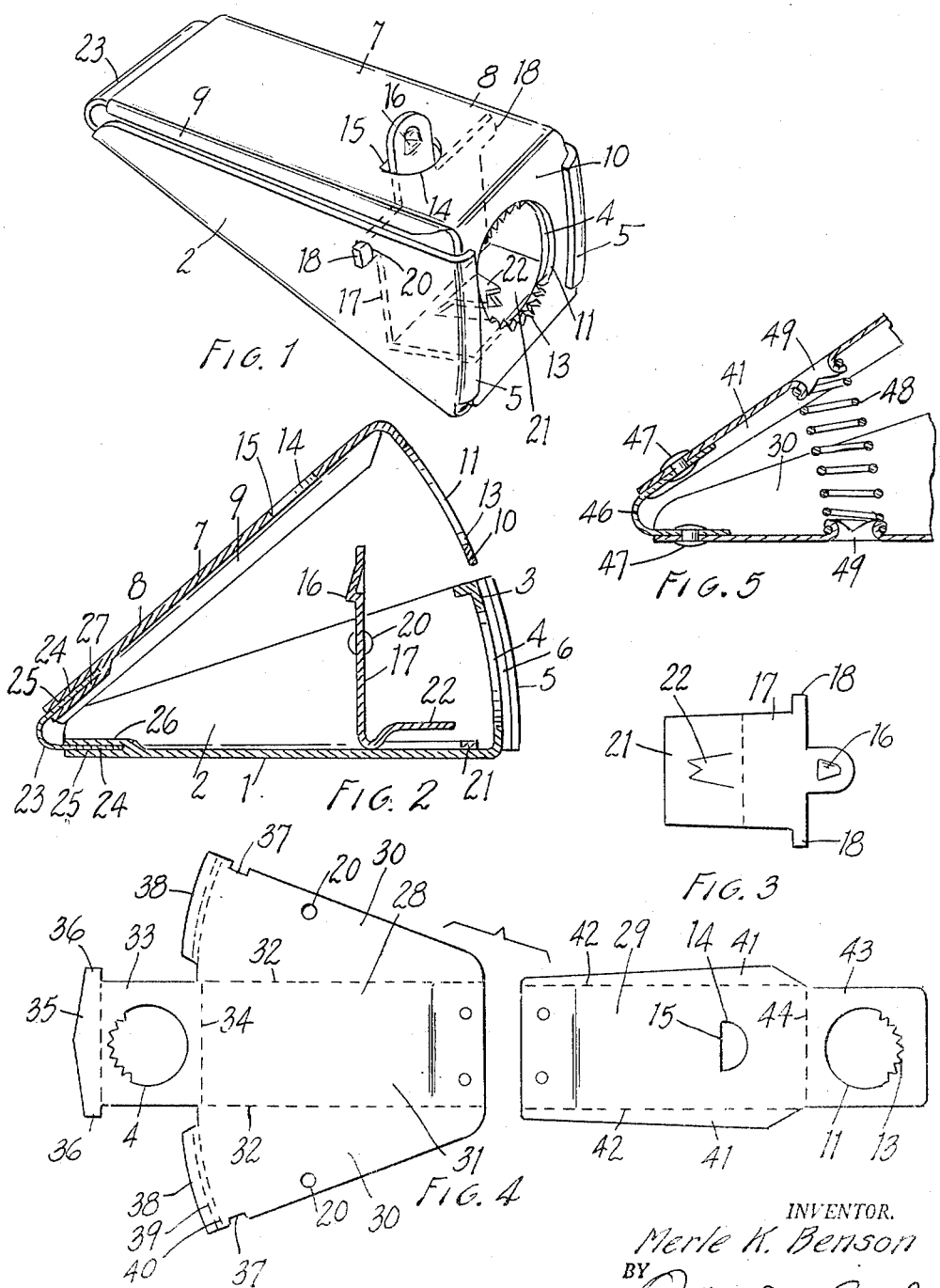
INVENTOR.
Merle K. Benson
BY
Otis A. Earl
Attorney.

Patented May 2, 1950

2,506,055

UNITED STATES PATENT OFFICE 2,506,055

ANIMAL TRAP

Merle K. Benson, Stevensville, Mich., assignor to Helms Industrial Development Company, Grand Rapids, Mich., a corporation of Michigan Application April 15, 1948, Serial No. 21,213

5 Claims. (Cl. 43—85)

This invention relates to improvements in animal traps.

The main objects of this invention are:

First, to provide an animal trap well adapted for use as a mouse trap and which is simple and economical in structure, easily set and at the same time, efficient.

Second, to provide an animal trap of this character which may be formed mainly of molded plastic or of sheet metal stampings, the parts being easily assembled.

Further objects relating to details and economies of the invention will definitely appear from the description to follow. The invention is pointed out in the claims.

A preferred embodiment of the apparatus for carrying out the method of the invention is clearly illustrated in the accompanying drawing, in which:

Fig. 1 is a front perspective view of a trap embodying my invention in set position.

Fig. 2 is a central longitudinal section with the trap in sprung or open position.

Fig. 3 is a plan view of the blank for the trigger member.

Fig. 4 is a plan view of the blanks for the body member and the jaw member in the flat or extended form when made of sheet metal.

Fig. 5 is a fragmentary longitudinal section of a modified form of my invention embodying an auxiliary jaw actuating spring, also illustrating the connection for the body member and jaw member when the parts are formed of sheet metal.

In the embodiment of my invention shown in Figs. 1, 2 and 3 I provide a body member comprising a bottom 1, rearwardly tapered side walls 2—2 and a front wall 3 having an entrance opening 4 therein. This front wall constitutes a fixed jaw member. The forward ends of the side walls are extended forwardly beyond the front wall and provided with inturned flanges 5 coacting with the front wall in providing ways 6.

The jaw member 7 comprises a top 8 having downwardly projecting side flanges 9 at its longitudinal edges and provided with a downwardly projecting jaw 10 having an opening 11 therein adapted to register with the opening 4 of the front wall or fixed jaw member when the trap is set. The lower segment of the opening 11 is preferably toothed or serrated at 13, this providing a firm grip on the animal engaged by the jaws. The jaw member 7 constitutes a cover for the body member when the trap is set.

The top of the jaw member has an opening 14 therein the rear edge 15 of which constitutes a keeper for the catch 16 of the trigger 17. The trigger 17 is provided with laterally projecting pivot lugs 18 engaging the pivot openings 20 in the side walls 2. At its lower end the trigger is provided with a forwardly projecting trip pan 21 having a tongue 22 struck up therefrom and adapted to receive a bait.

In the embodiment shown in Figs. 1 and 2 the body and jaw members are formed of plastic. They are swingably connected at their rear ends by means of the U-shaped spring 23, the arms 24 of which are imbedded or secured in slot like recesses 25 formed in the embossed or thickened portions 26 and 27 of the body and jaw members. In manufacturing the structure the parts are desirably formed with these slot like recesses, the U-shaped spring inserted after the walls of the recesses have been coated with a solvent for the plastic.

These parts may, however, be made as sheet metal stampings and in Figs. 4 and 5 I illustrate the sheet metal blanks 28 and 29 of a slightly modified structure. The folding lines connecting the side walls 30 to the bottom 31 are indicated at 32. The front wall 33 is folded on the dotted line 34, the front wall having a cross piece extension 35 having projecting ends 36 which engage in notches 37 when the side walls and end walls are fully erected. The end flange portions 38 of the side walls are folded along the dotted lines 39 and 40. The jaw member 29 is provided with flange portions 41 foldable along the line 42. The jaw 43 is folded along the line 44 to bring the parts into the same relation as shown in Figs. 1 and 2. The U-shaped spring 46 is secured by means of rivets 47. An auxiliary coil spring 48 is provided for biasing the jaw member to open position, this being engaged at its ends with studs 49 struck inwardly from the bottom of the body member and the top portion of the jaw member.

To set the trap the bait is engaged with the tongue 22 of the trigger, the jaw member pushed downwardly and the trigger pulled rearwardly to engage the catch 16 with the keeper 15. The parts being of plastic or metal can be readily cleaned or sterilized should occasion require. The parts are simple and economical to produce and assemble.

The stock used may be of light gage in as much as they are so formed and associated as to utilize the strength thereof very efficiently.

I have illustrated and described my invention in highly practical embodiments thereof. I have not attempted to illustrate certain embodiments

Having thus described my invention, what I claim as new and desire to secure by Letters Patent is:

1. In an animal trap, the combination of a body member comprising, a bottom, rearwardly tapered side walls, and a front wall having an entrance opening therein, the forward ends of the side walls projecting forwardly of the front wall and having inturned flanges spaced therefrom and coacting therewith in providing ways, said body member being formed integrally of plastic material, a jaw member having a top portion provided with downturned side flanges and a downwardly projecting jaw at its front end slidable in said ways and having an entrance opening registering with the entrance opening of said front wall when the jaw member is in set position, said jaw member and jaw being formed integrally of plastic material, a U-shaped spring having its ends imbedded in the rear ends of said body and jaw members and acting to yieldingly urge the jaw member outwardly, a trigger pivotally mounted between the side walls of said body member and having an upwardly projecting catch, said jaw member having an opening therein the rear edge of which constitutes a keeper with which said catch is engageable when the jaw member is in set position, said trigger being provided with a forwardly projecting pan having a bait securing tongue struck up therefrom.

2. In an animal trap, the combination of a body member comprising, a bottom, rearwardly tapered side walls, and a front wall having an entrance opening therein, the forward ends of the side walls projecting forwardly of the front wall and having inturned flanges spaced therefrom and coacting therewith in providing ways, a jaw member having a top portion provided with downturned side flanges and a downwardly projecting jaw at its front end slidable in said ways and having an entrance opening registering with the entrance opening of said front wall when the jaw member is in set position, a U-shaped spring having its ends connected to the rear ends of said body and jaw members and acting to yieldingly urge the jaw member outwardly, a trigger pivotally mounted between the side walls of said body member and having an upwardly projecting catch, said jaw member having an opening therein the rear edge of which constitutes a keeper with which said catch is engageable when the jaw member is in set position, said trigger being provided with a forwardly projecting pan having a bait securing tongue struck up therefrom.

3. In an animal trap, the combination of an integrally formed body member comprising, a bottom, rearwardly tapered side walls, and a front wall having an entrance opening therein, the forward ends of the side walls projecting forwardly of the front wall and having inturned flanges spaced therefrom and coacting therewith in providing ways, a jaw member comprising a top portion constituting a cover for said body member and provided with a downwardly projecting jaw at its front end slidable in said ways and having an entrance opening registering with the entrance opening of said front wall when the jaw member is in set position, a U-shaped spring having its ends connected to the rear ends of said body and jaw members and acting to yieldingly urge the jaw member outwardly, a trigger pivotally mounted between the side walls of said body member, and releasably engageable with said jaw member for holding it in set position, said trigger being provided with a bait holder.

4. In an animal trap, the combination of a body member comprising, a bottom, side walls, and a front wall having an entrance opening therein, the forward ends of the side walls projecting forwardly of the front wall and having inturned flanges spaced therefrom and coacting therewith in providing ways, a spring biased jaw member comprising a top portion constituting a cover for said body member and provided with a downwardly projecting jaw at its front end slidable in said ways and having an entrance opening registering with the entrance opening of said front wall when the jaw member is in set position, a trigger mounted between the side walls of said body member and releasably engageable with said jaw member for holding it in set position, said trigger being provided with a bait holder.

5. In an animal trap, the combination of a body member comprising, a bottom, side walls, and a front wall having an entrance opening, a spring actuated jaw member swingably connected at its rear end to the rear end of said body member, said jaw member comprising a top portion constituting a cover for said body member and having a downwardly projecting jaw at its front end slidable relative to the front wall of said body member, and a trigger pivotally mounted between the side walls of said body member and having an upwardly projecting catch, said jaw member top portion having an opening therein through which said catch projects when the jaw member is in closed position the catch being engageable with an edge of the opening for holding the jaw member in set position.

MERLE K. BENSON.

REFERENCES CITED

The following references are of record in the file of this patent:

UNITED STATES PATENTS

| Number | Name | Date |
|---|---|---|
| 2,481,800 | Tyler | Sept. 13, 1949 |